US012307965B2

(12) United States Patent
Zhang et al.

(10) Patent No.: US 12,307,965 B2
(45) Date of Patent: May 20, 2025

(54) PIXEL CIRCUIT, DRIVING METHOD THEREFOR, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Jingwen Zhang, Beijing (CN); Yonglin Guo, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/027,215

(22) PCT Filed: May 26, 2022

(86) PCT No.: PCT/CN2022/095311

§ 371 (c)(1),
(2) Date: Mar. 20, 2023

(87) PCT Pub. No.: WO2023/225955

PCT Pub. Date: Nov. 30, 2023

(65) Prior Publication Data

US 2024/0312404 A1 Sep. 19, 2024

(51) Int. Cl.
*G09G 3/32* (2016.01)
*G09G 3/3233* (2016.01)

(52) U.S. Cl.
CPC ............. *G09G 3/3233* (2013.01); *G09G 3/32* (2013.01); *G09G 2310/08* (2013.01); *G09G 2320/0247* (2013.01); *G09G 2330/021* (2013.01)

(58) Field of Classification Search
CPC .... G09G 3/3233; G09G 3/32; G09G 2310/08; G09G 2320/0247; G09G 2330/021; G09G 3/3208
See application file for complete search history.

(56) References Cited

U.S. PATENT DOCUMENTS

2009/0201231 A1* 8/2009 Takahara ............. G09G 3/3233 345/76
2011/0157125 A1* 6/2011 Choi .................... G09G 3/3233 315/160

(Continued)

FOREIGN PATENT DOCUMENTS

CN 108987453 A 12/2018
CN 111724744 A 9/2020

(Continued)

*Primary Examiner* — Hong Zhou
(74) *Attorney, Agent, or Firm* — IPro, PLLC

(57) ABSTRACT

A pixel circuit, a driving method therefor, and a display device are disclosed. In the pixel circuit, a first reset transistor is coupled between a first electrode of a light emitting device and a first initialization signal terminal, and a gate of the first reset transistor is coupled to a first light emitting control terminal; a second electrode of the light emitting device is coupled to a first power supply terminal; a compensation transistor is coupled between a gate and a first electrode of a drive transistor, and a gate of the compensation transistor is coupled to a first scan control terminal; a data writing transistor is coupled between a second electrode of the drive transistor and a data signal terminal, and a gate of the data writing transistor is coupled to a second scan control terminal.

6 Claims, 11 Drawing Sheets

(56) References Cited

U.S. PATENT DOCUMENTS

| | | | | |
|---|---|---|---|---|
| 2020/0226978 | A1* | 7/2020 | Lin | H01L 29/7869 |
| 2021/0027696 | A1* | 1/2021 | Kim | G09G 3/3233 |
| 2021/0065624 | A1* | 3/2021 | Li | G09G 3/3233 |
| 2021/0280132 | A1* | 9/2021 | Gao | G09G 3/3233 |
| 2022/0301504 | A1 | 9/2022 | Wang et al. | |
| 2022/0335872 | A1* | 10/2022 | Zhang | G09G 3/20 |
| 2023/0031984 | A1 | 2/2023 | Wang et al. | |
| 2023/0171996 | A1* | 6/2023 | Li | H10K 59/131 257/40 |
| 2023/0215353 | A1 | 7/2023 | Zhang et al. | |

FOREIGN PATENT DOCUMENTS

| | | | |
|---|---|---|---|
| CN | 112992070 | A | 6/2021 |
| CN | 113112955 | A | 7/2021 |
| CN | 113950715 | A | 1/2022 |
| CN | 114120910 | A | 3/2022 |
| CN | 114241993 | A | 3/2022 |

* cited by examiner

PIXEL CIRCUIT, DRIVING METHOD THEREFOR, AND DISPLAY DEVICE

FIELD

The disclosure relates to the field of display technology, and particularly to a pixel circuit, a driving method therefor, and a display device.

BACKGROUND

With development of the Active Matrix Organic Light Emitting Diode (AMOLED) technology, requirements for image quality become higher and higher. In a process of pursuing higher image quality, a manufacturing process leads to a problem of uniformity of a threshold voltage of a Driver Thin Film Transistor (DTFT). Hysteresis of the DTFT causes afterimages and abnormal brightness of the first frame, and problems such as flickering at a low gray scale occur when switching between different driving frequencies, and need to be solved urgently.

SUMMARY

The disclosure provides a pixel circuit, a driving method therefor, and a display device, to improve the display effect of the display device.

In a first aspect, an embodiment of the disclosure provides a pixel circuit, including: a first reset transistor, a compensation transistor, a drive transistor, a data writing transistor, a first light emitting control transistor, a second light emitting control transistor, a light emitting device and a first capacitor; where:

- the first reset transistor is coupled between a first electrode of the light emitting device and a first initialization signal terminal, and a gate of the first reset transistor is coupled to a first light emitting control terminal;
- a second electrode of the light emitting device is coupled to a first power supply terminal;
- the compensation transistor is coupled between a gate and a first electrode of the drive transistor, and a gate of the compensation transistor is coupled to a first scan control terminal;
- the data writing transistor is coupled between a second electrode of the drive transistor and a data signal terminal, and a gate of the data writing transistor is coupled to a second scan control terminal;
- the first light emitting control transistor is coupled between a second power supply terminal and the second electrode of the drive transistor, and a gate of the first light emitting control transistor is coupled to the first light emitting control terminal;
- the second light emitting control transistor is coupled between the first electrode of the drive transistor and the first electrode of the light emitting device, and a gate of the second light emitting control transistor is coupled to a second light emitting control terminal;
- the first capacitor is coupled between the second power supply terminal and the gate of the drive transistor;
- where types of the first light emitting control transistor and the second light emitting control transistor are same and opposite to a type of the first reset transistor; the first light emitting control terminal is configured to receive a first light emitting control signal, the second light emitting control terminal is configured to receive a second light emitting control signal, the first light emitting control signal and the second light emitting control signal are provided by output terminals in different stages of a same light emitting drive unit, and the second light emitting control signal is earlier than the first light emitting control signal.

In a possible implementation, the pixel circuit further includes a second reset transistor coupled between the first electrode of the drive transistor and a second initialization signal terminal, where a gate of the second reset transistor is coupled to an initialization control terminal.

In a possible implementation, the second reset transistor is of a same type as the data writing transistor; the second scan control terminal is configured to receive a first scan control signal, the initialization control terminal is configured to receive a second scan control signal, the first scan control signal and the second scan control signal are provided by output terminals in different stages of a same gate drive unit, and the second scan control signal is earlier than the first scan control signal.

In a possible implementation, the first initialization signal terminal and the second initialization signal terminal are a same signal terminal or different signal terminals.

In a possible implementation, the pixel circuit further includes: a second capacitor coupled between the second power supply terminal and the second electrode of the drive transistor.

In a possible implementation, a capacitance value of the second capacitor is less than a capacitance value of the first capacitor.

In a possible implementation, the first light emitting control transistor, the second light emitting control transistor, the drive transistor and the data writing transistor are all P-type transistors; and the compensation transistor and the first reset transistor are both N-type transistors.

In a possible implementation, active layers of the compensation transistor and the first reset transistor are made of a metal oxide semiconductor material; and active layers of the drive transistor, the data writing transistor, the first light emitting control transistor and the second light emitting control transistor are made of a low temperature poly-silicon material.

In a second aspect, an embodiment of the disclosure further provides a display device, including the pixel circuit described in any one of the above implementations.

In a third aspect, an embodiment of the disclosure further provides a driving method for the pixel circuit as described in any one of the above implementations, including:

- dividing a current display frame of a display device into one writing frame and N holding frames according to a current refresh frequency and a reference refresh frequency of the display device, where N is an integer greater than 1, and the writing frame includes a first phase, a second phase, a third phase, a fourth phase and a fifth phase arranged in sequence;
- in the first phase, controlling the first light emitting control transistor, the drive transistor and the compensation transistor to be turned on, and resetting potentials of the first electrode, the gate and the second electrode of the drive transistor through the second power supply terminal;
- in the second phase, controlling the first reset transistor, the compensation transistor and the second light emitting control transistor to be turned on, resetting the potentials of the first electrode, the gate and the second electrode of the drive transistor, and resetting a potential of the first electrode of the light emitting device through the first initialization signal terminal;

in the third phase, controlling the first light emitting control transistor and the drive transistor to be turned on, and resetting potentials of the first electrode and the second electrode of the drive transistor;

in the fourth phase, controlling the first reset transistor, the compensation transistor, the drive transistor and the data writing transistor to be turned on, resetting the potential of the first electrode of the light emitting device, loading a data signal provided by the data signal terminal to the second electrode of the drive transistor, writing a threshold voltage of the drive transistor and the data signal into the gate of the drive transistor through the compensation transistor, and storing the threshold voltage and the data signal in the first capacitor;

in the fifth phase, controlling the first reset transistor and the second light emitting control transistor to be turned on, and resetting a potential of the first electrode of the drive transistor through the first initialization signal terminal.

In a possible implementation, the holding frame includes a sixth phase and a seventh phase arranged in sequence;

in the sixth phase, controlling the second light emitting control transistor and the first light emitting control transistor to be turned off successively and the first reset transistor to be turned on, and resetting the potential of the first electrode of the light emitting device through the first initialization signal terminal;

in the seventh phase, controlling the first reset transistor and the second light emitting control transistor to be turned on, and resetting a potential of the second electrode of the drive transistor through the first power supply terminal.

In a possible implementation, the first phase and the second phase are taken as a repeating unit, the writing frame includes M repeating units arranged in sequence, and M is a positive integer greater than 1.

In a possible implementation, the M repeating units include two repeating units including a first repeating unit and a second repeating unit, and a duration occupied by the second light emitting control signal in the first repeating unit is greater than a duration occupied by the second light emitting control signal in the second repeating unit.

In a possible implementation, the pixel circuit further includes a second reset transistor, the writing frame further includes an eighth phase between the third phase and the fourth phase, and the method further includes:

in a time period between the eighth phase and the fourth phase, keeping signals loaded by the first light emitting control terminal, the second light emitting control terminal, the first scan control terminal and the second scan control terminal to be in a stable voltage state; and keeping a potential of the gate of the drive transistor to be same as a control signal provided by a second initialization signal terminal coupled to the second reset transistor.

In a possible implementation, the pixel circuit further includes a second capacitor coupled between the second power supply terminal and the second electrode of the drive transistor, and the method further includes:

in the fourth phase, loading the data signal to the second electrode of the drive transistor, and storing the data signal in the second capacitor;

continuing to charge the second electrode of the drive transistor through the second capacitor.

DETAILED DESCRIPTION OF EMBODIMENTS

In order to make purposes, technical solutions and advantages of the disclosure clearer, the technical solutions of embodiments of the disclosure will be described clearly and completely below in combination with the accompanying drawings of embodiments of the disclosure. Obviously the described embodiments are a part of embodiments of the disclosure but not all embodiments. Also in the case of no conflict, embodiments and the features therein in the disclosure can be combined with each other. Based upon embodiments of the disclosure, all of other embodiments obtained by those ordinary skilled in the art without creative work pertain to the protection scope of the disclosure.

Unless otherwise defined, the technical or scientific terms used in the disclosure shall have the general meaning understood by those ordinary skilled in the art to which the disclosure belongs. The word such as "include" or "contain" or the like used in the disclosure means that the element or object appearing before this word encompasses the elements or objects and their equivalents listed after this word, without excluding other elements or objects.

It should be noted that the size and shape of each diagram in the accompanying drawings do not reflect the true proportion, and are merely for purpose of schematically illustrating the content of the disclosure. Also, the same or similar reference numbers represent the same or similar elements or the elements having the same or similar functions all the way.

Figure 1:
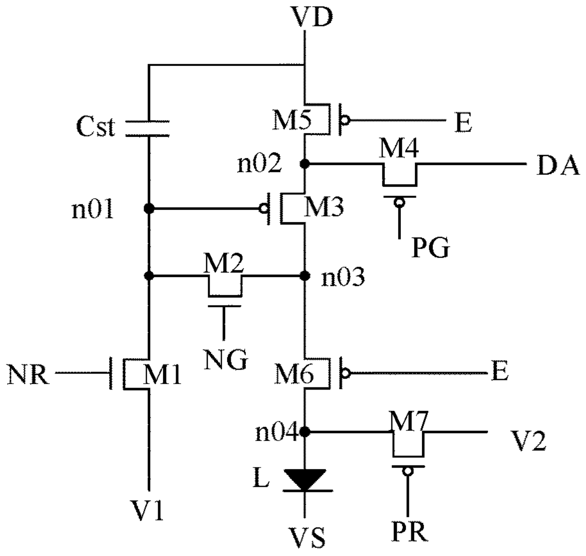
FIG. 1 is a schematic structural diagram of a pixel circuit used in the related art.
Figure 2:
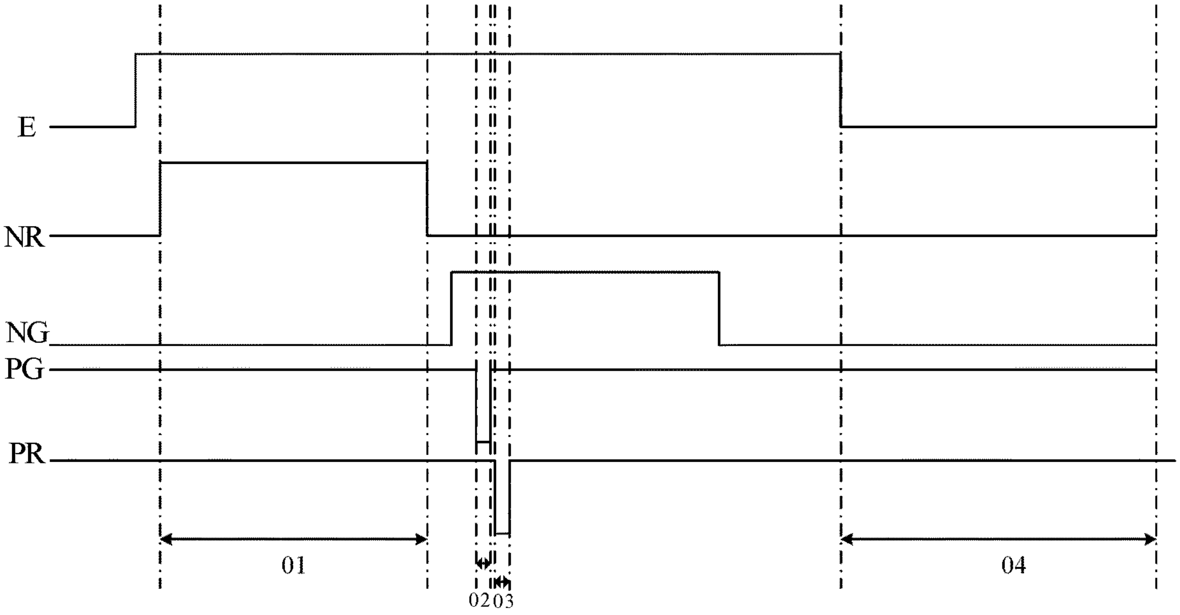
FIG. 2 is a timing diagram used by the pixel circuit shown in FIG. 1.

In the related art, a pixel circuit shown in FIG. 1 and a timing diagram shown in FIG. 2 are often used. M3 represents a DTFT; L represents a light emitting device; n01, n02 and n03 represent nodes of transistors coupled respectively to electrodes of the DTFT; M1 and M2 are N-type transistors; M3, M4, M5, M6 and M7 are P-type transistors; M1 and M2 are metal oxide transistors, and M3 to M7 are low temperature poly-silicon transistors. The threshold voltage of the DTFT is compensated to ensure the uniformity of the threshold voltage of the DTFT and alleviate the problem of low-frequency flicker. Still combined with FIG. 1 and FIG. 2, the node n01 is reset in the phase 01; the data signal is written to compensate for the threshold voltage of the DTFT in the phase 02; the anode (corresponding to the node n04 in FIG. 1) of the light emitting device L is reset in the phase 03; and the light emitting device L emits light in the phase 04. For the specific working process of the pixel circuit shown in FIG. 1, reference may be made to specific implementations in the related art, which will not be repeated here.

In the pixel circuit shown in FIG. 1, the NR and NG are driven by a same group of Gate on Arrays (GOAs), the PG and PR are driven by a same group of GOAs, and the V1 and V2 may use the same signal or different signals. In this case, the pixel circuit needs three groups of GOAs and one or two reset signals. The threshold voltage of the DTFT can be compensated by the pixel circuit. Since the M1 and M2 are metal oxide transistors, the anode reset may be performed in the holding frame, thereby avoiding the low-frequency flicker. However, there are still some problems caused by flicker at a low gray scale (that is, frequency cut flicker) when switching between different driving frequencies and the DTFT hysteresis.

Figure 3:
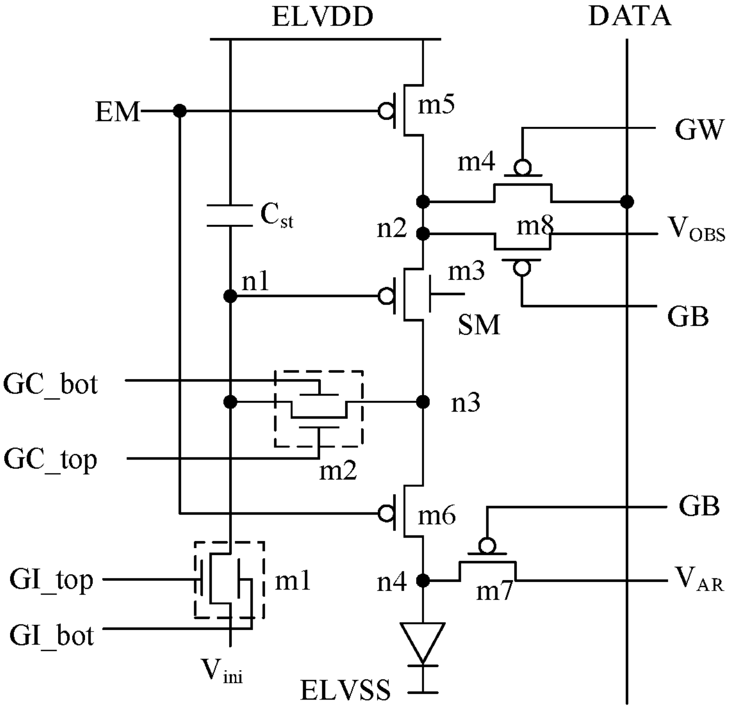
FIG. 3 is a schematic structural diagram of a pixel circuit used in the related art.
Figure 4:
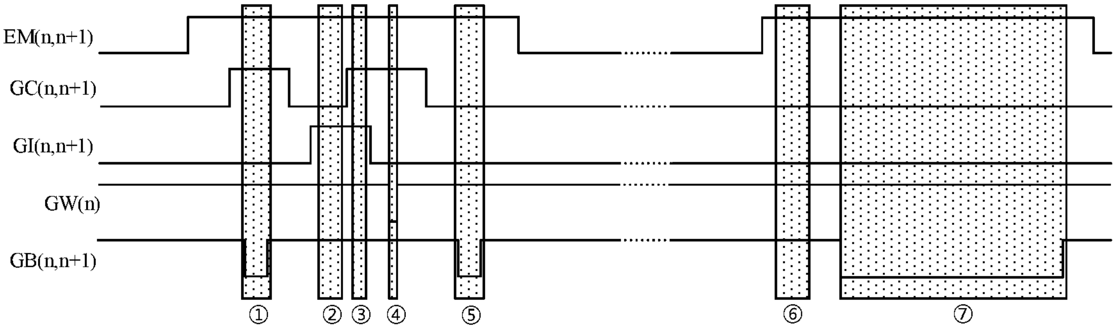
FIG. 4 is a timing diagram used by the pixel circuit shown in FIG. 3.

Therefore, in the related art, the pixel circuit shown in FIG. 3 can be used in combination with the timing diagram shown in FIG. 4 to alleviate the above problems, where the pixel circuit includes eight transistors m1, m2, m3, m4, m5, m6, m7 and m8; m3 represents a DTFT; n1, n2 and n3 respectively represent nodes of transistors correspondingly coupled to the electrodes of the DTFT; m1 and m2 are metal oxide transistors, and m3 to m8 are low-temperature poly-silicon transistors. In the phase ①, n1, n2 and n3 are reset at a high level and light is emitted; in the phase ②, n1 is reset at a low level, and the DTFT has a larger Vgs; in the phase ③, n1, n2 and n3 are reset at a low level; in the phase ④, the DATA is written, and the threshold voltage of the DTFT is compensated; in the phase ⑤, the anode (corresponding to the node n4 in FIG. 3) is reset at a low level, and the n3 is reset at a high level; in the phase ⑥, the light emitting control signal em is adjusted by the Pulse Width Modulation (PWM) technology; and in the phase ⑦, the anode is reset (Anode Reset), n3 is reset at a high level, which can alleviate the frequency cut flicker together with the phase ⑤ in which n3 is reset at the low level. In the process of controlling the pixel circuit shown in FIG. 3 by using the timing diagram shown in FIG. 4, the nodes n1, n2 and n3 may all be reset, or the nodes n1, n2 and n3 may be alternately reset by using high and low levels, and the voltage Vgs of the DTFT is increased, etc., thereby further alleviating the hysteresis problem of the DTFT and ensuring the display effect.

However, in FIGS. 3 and 4, this pixel circuit is essentially an 8T1C structure, which requires five groups of GOAs and three reset signals. In this case, this pixel circuit requires more transistors and more GOAs and reset signals compared with the pixel circuit shown in FIG. 1, which is not conducive to increasing the Pixels Per Inch (PPI), narrowing borders and reducing GOA power consumption.

In view of this, an embodiment of the disclosure provides a pixel circuit, a driving method therefor, and a display device, to improve the display effect of the display device.

Figure 5:
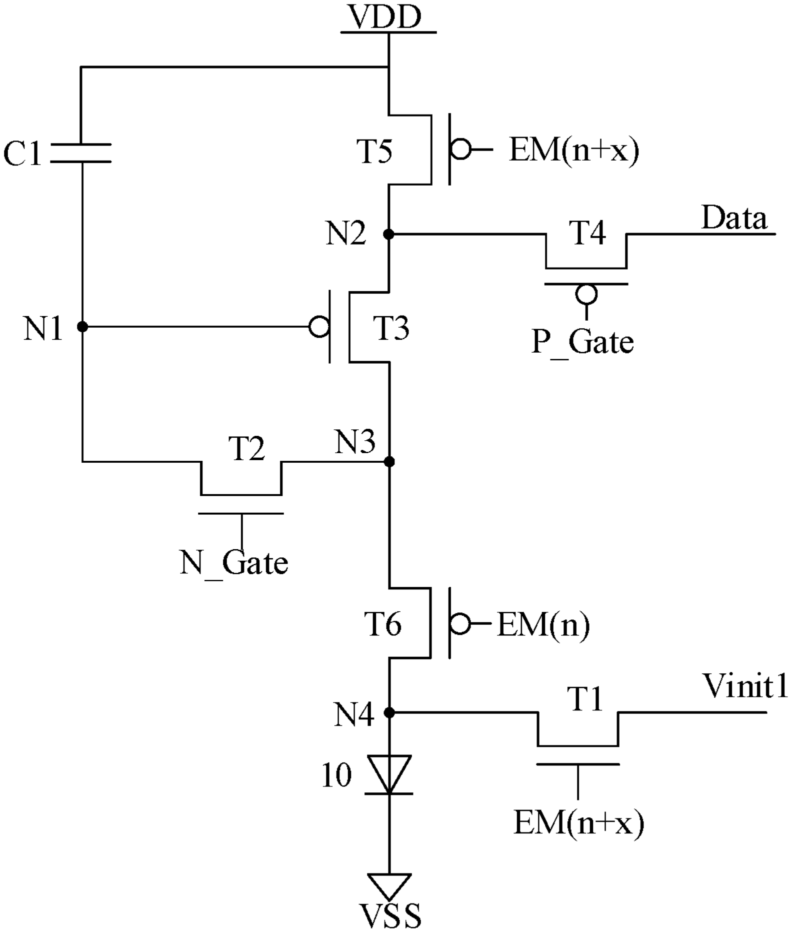
FIG. 5 is a schematic structural diagram of a pixel circuit according to an embodiment of the disclosure.

As shown in FIG. 5, an embodiment of the disclosure provides a pixel circuit, the pixel circuit includes: a first reset transistor T1, a compensation transistor T2, a drive transistor T3, a data writing transistor T4, a first light emitting control transistor T5, a second light emitting control transistor T6, a light emitting device 10 and a first capacitor C1.

The first reset transistor T1 is coupled between a first electrode of the light emitting device 10 and a first initialization signal terminal Vinit1, and a gate of the first reset transistor T1 is coupled to a first light emitting control terminal EM(n+x).

A second electrode of the light emitting device 10 is coupled to a first power supply terminal VSS.

The compensation transistor T2 is coupled between a gate and a first electrode of the drive transistor T3, and a gate of the compensation transistor T2 is coupled to a first scan control terminal N_Gate.

The data writing transistor T4 is coupled between a second electrode of the drive transistor T3 and a data signal terminal Data, and a gate of the data writing transistor T4 is coupled to a second scan control terminal P_Gate.

The first light emitting control transistor T5 is coupled between a second power supply terminal VDD and the second electrode of the drive transistor T3, and a gate of the first light emitting control transistor T5 is coupled to the first light emitting control terminal EM(n+x).

The second light emitting control transistor T6 is coupled between the first electrode of the drive transistor T3 and the first electrode of the light emitting device 10, and a gate of the second light emitting control transistor T6 is coupled to a second light emitting control terminal EM(n).

The first capacitor C1 is coupled between the second power supply terminal VDD and the gate of the drive transistor T3.

Types of the first light emitting control transistor T5 and the second light emitting control transistor T6 are same and opposite to a type of the first reset transistor T1; the first light emitting control terminal EM(n+x) is configured to receive a first light emitting control signal, the second light emitting control terminal EM(n) is configured to receive a second light emitting control signal, the first light emitting control signal and the second light emitting control signal are provided by output terminals in different stages of a same light emitting drive unit, and the second light emitting control signal is earlier than the first light emitting control signal.

Still referring to FIG. 5, the pixel circuit provided by an embodiment of the disclosure may include six transistors: a first reset transistor T1, a compensation transistor T2, a drive transistor T3, a data writing transistor T4, a first light emitting control transistor T5 and a second light emitting control transistor T6. Compared with the pixel circuits shown in FIG. 1 and FIG. 3, the quantity of transistors in the pixel circuit is reduced to facilitate the narrow border design. Here, the first reset transistor T1 is coupled between the first electrode of the light emitting device 10 and the first initialization signal terminal Vinit1, and the gate of the first reset transistor T1 is coupled to the first light emitting control terminal EM(n+x). In this case, when the first reset transistor T1 is turned on, the first electrode (that is, the node N4 in FIG. 5) of the light emitting device 10 may be reset through the first initialization signal terminal Vinit1; and when the first electrode of the light emitting device 10 is an anode, the anode reset is realized, thereby alleviating the frequency-cut flicker. The second electrode of the light emitting device 10 is coupled to the first power supply terminal VSS, and the first power supply terminal VSS may be a low-potential power supply terminal and may provide a constant low-potential signal. The compensation transistor T2 is coupled between the gate and the first electrode of the drive transistor T3, and the gate of the compensation transistor T2 is coupled to the first scan control terminal N_Gate. The data writing transistor T4 is coupled between the second electrode of the drive transistor T3 and the data signal terminal Data, and the gate of the data writing transistor T4 is coupled to the second scan control terminal P_Gate. When the compensation transistor T2, the drive transistor T3 and the data writing transistor T4 are all turned on, the threshold voltage of the drive transistor T3 and the data signal provided by the data signal terminal Data may be written into the first capacitor C1, thereby realizing the compensation for the threshold voltage of the drive transistor T3.

Still referring to FIG. 5, the first light emitting control transistor T5 is coupled between the second power supply terminal VDD and the second electrode of the drive transistor T3, and the gate of the first light emitting control transistor T5 is coupled to the first light emitting control terminal EM(n+x). The second power supply terminal VDD may be a high-potential power supply terminal, and may provide a constant high-potential signal. The second light emitting control transistor T6 is coupled between the first electrode of the drive transistor T3 and the first electrode of the light emitting device 10, and the gate of the second light emitting control transistor T6 is coupled to the second light emitting control terminal EM(n). The first capacitor C1 is coupled between the second power supply terminal VDD and the gate of the drive transistor T3. Here, the types of the first light emitting control transistor T5 and the second light emitting control transistor T6 are same and opposite to the type of the first reset transistor T1. In one of embodiments, the first light emitting control transistor T5 and the second light emitting control transistor T6 are both P-type transistors, and the first reset transistor T1 is an N-type transistor. The first light emitting control terminal EM(n+x) is configured to receive a first light emitting control signal, the second light emitting control terminal EM(n) is configured to receive a second light emitting control signal, the first light emitting control signal and the second light emitting control signal are provided by output terminals in different stages of a same light emitting drive unit, and the second light emitting control signal is earlier than the first light emitting control signal. In this way, the entire pixel circuit needs two light emitting driving units, and two gate driving units respectively coupled to the first scan control terminal N_Gate and the second scan control terminal P_Gate, and needs only one kind of reset signal provided by the first initialization signal terminal Vinit1.

In a specific implementation process, the use of the pixel circuit shown in FIG. 5 can not only realize the compensation for the threshold voltage of the drive transistor T3, but also realize the simultaneous reset and alternate reset of the electrodes of the drive transistor T3, thereby simplifying the structure of the pixel circuit, reducing the quantity of transistors and ensuring the narrow border design, while alleviating the hysteresis problem of the drive transistor T3, avoiding the problems such as afterimages, abnormal brightness of the first frame, and flickering at a low gray scale when switching between different driving frequencies, and improving the display effect of the display device.

Figure 6:
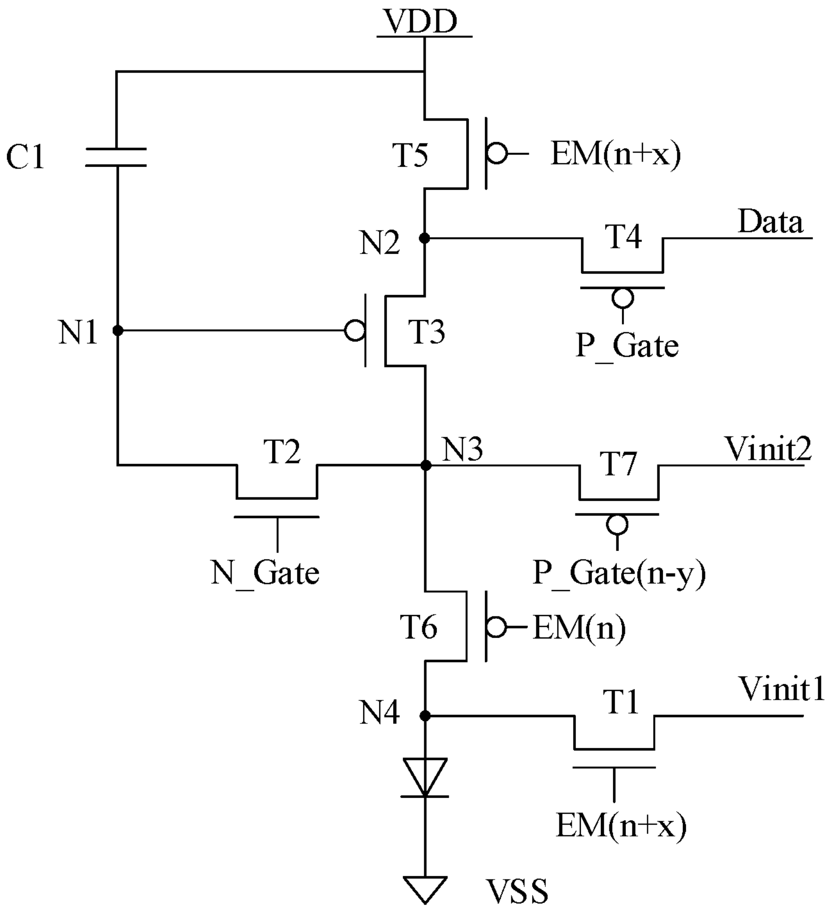
FIG. 6 is a schematic structural diagram of a pixel circuit according to an embodiment of the disclosure.

In one of embodiments, as shown in FIG. 6, the pixel circuit further includes a second reset transistor T7 coupled between the first electrode of the drive transistor T3 and a second initialization signal terminal, where a gate of the second reset transistor T7 is coupled to an initialization control terminal P_Gate(n−y).

Still referring to FIG. 6, the pixel circuit further includes the second reset transistor T7 coupled between the first electrode of the drive transistor T3 and the second initialization signal terminal Vinit2, where the gate of the second reset transistor T7 is coupled to the initialization control terminal P_Gate(n−y). In this way, when the second reset transistor T7 is turned on, the first electrode of the drive transistor T3 can be reset through the second initialization signal terminal Vinit2, alleviating the hysteresis problem of the drive transistor T3.

In an embodiment of the disclosure, the second reset transistor T7 is of a same type as the data writing transistor T4; the second scan control terminal P_Gate is configured to receive a first scan control signal, the initialization control terminal P_Gate(n−y) is configured to receive a second scan control signal, the first scan control signal and the second scan control signal are provided by output terminals in different stages of a same gate drive unit, and the second scan control signal is earlier than the first scan control signal.

In a specific implementation process, the second reset transistor T7 is of the same type as the data writing transistor T4. In one of embodiments, still referring to FIG. 6, the second reset transistor T7 and the data writing transistor T4 may both be P-type transistors. The second scan control terminal P_Gate is configured to receive the first scan control signal, the initialization control terminal P_Gate(n−y) is configured to receive the second scan control signal, the first scan control signal and the second scan control signal are provided by the output terminals in different stages of the same gate drive unit, and the second scan control signal is earlier than the first scan control signal. Here, the first initialization signal terminal Vinit1 and the second initialization signal terminal are a same signal terminal or different signal terminals. In this case, the entire pixel circuit needs two light emitting drive units and two gate drive units, and needs at most two kinds of reset signals provided by the first initialization signal terminal Vinit1 and the second initialization signal terminal. Thus, the use of the pixel circuit shown in FIG. 6 can not only realize the compensation for the threshold voltage of the drive transistor T3, but also realize the simultaneous reset and alternate reset of the electrodes of the drive transistor T3, thereby simplifying the structure of the pixel circuit, reducing the quantity of transistors and ensuring the narrow border design, while alleviating the hysteresis problem of the drive transistor T3, avoiding the problems such as afterimages, abnormal brightness of the first frame, and flickering at a low gray scale when switching between different driving frequencies, and improving the display effect of the display device.

In an embodiment of the disclosure, the pixel circuit further includes: a second capacitor C2 coupled between the second power supply terminal VDD and the second electrode of the drive transistor T3.

Figure 7:
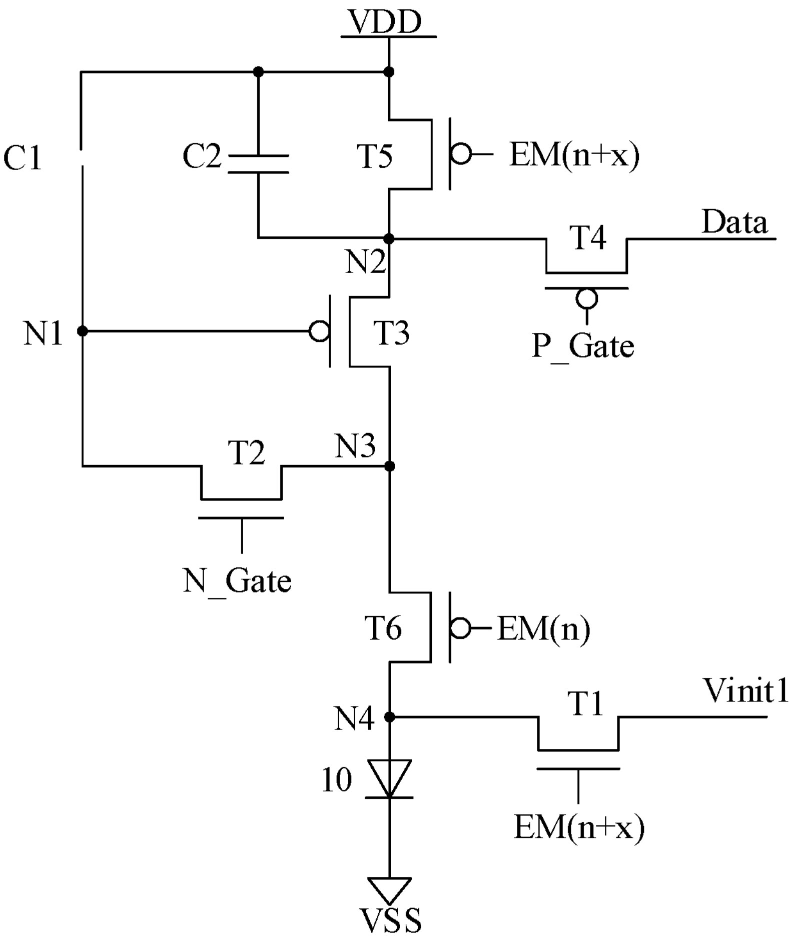
FIG. 7 is a schematic structural diagram of a pixel circuit according to an embodiment of the disclosure.

In one of embodiments, as shown in FIG. 7, the pixel circuit further includes a second capacitor C2 coupled between the second power supply terminal VDD and the second electrode of the drive transistor T3, where the capacitance value of the second capacitor C2 is less than the capacitance value of the first capacitor C1.

Figure 8:
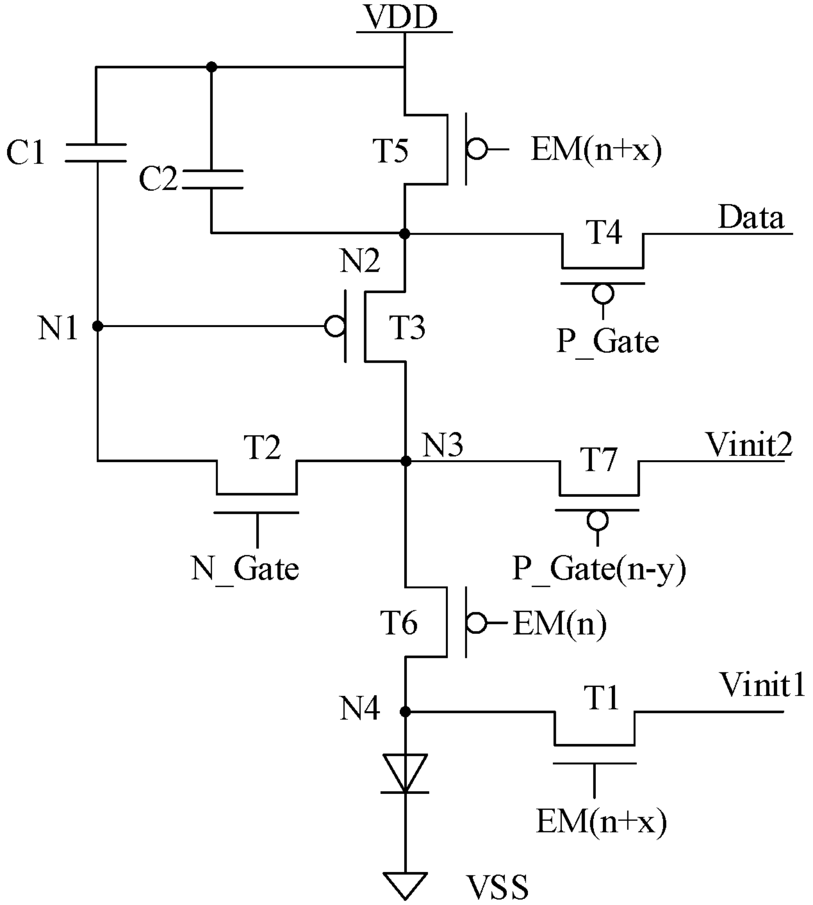
FIG. 8 is a schematic structural diagram of a pixel circuit according to an embodiment of the disclosure.

In one of embodiments, as shown in FIG. 8, the pixel circuit further includes a second capacitor C2 coupled between the second power supply terminal VDD and the second electrode of the drive transistor T3, where the capacitance value of the second capacitor C2 is less than the capacitance value of the first capacitor C1.

It should be noted that, in embodiments corresponding to FIG. 7 and FIG. 8, the capacitance value of the second capacitor C2 is greater than 10 fF. In this case, the second capacitor C2 can charge the node N2 through the data writing transistor T4, thereby ensuring the use performance of the pixel circuit. The capacitance value of the second capacitor C2 may be set to be less than the capacitance value of the first capacitor C1, thereby ensuring the layout space of the pixel circuit.

Still referring to FIG. 7 and FIG. 8, in the case of high frequency, when the data writing transistor T4, the drive transistor T3 and the compensation transistor T2 are all turned on, the node N2 can be charged through the data signal terminal Data, and the power is stored in the second capacitor C2; and subsequently, when the data writing transistor T4 is turned off and the compensation transistor T2 is still turned on, the threshold voltage of the node N1 can continue to be compensated through the second capacitor C2 and the node N2.

In an embodiment of the disclosure, the first light emitting control transistor T5, the second light emitting control transistor T6, the drive transistor T3 and the data writing transistor T4 are all P-type transistors; and the compensation transistor T2 and the first reset transistor T1 are both N-type transistors.

In a specific implementation process, as shown in FIG. 5 to FIG. 8, the first light emitting control transistor T5, the second light emitting control transistor T6, the drive transistor T3 and the data writing transistor T4 are all P-type transistors, and the compensation transistor T2 and the first reset transistors T1 are both N-type transistors. In this way, only when the first light emitting control signal provided by the first light emitting control terminal EM(n+x) is at a low level, the first light emitting control transistor T5 may be turned on; only when the second light emitting control signal provided by the second light emitting control terminal EM(n) is at a low level, the second light emitting control transistor T6 may be turned on; only when the first scan control signal provided by the second scan control terminal P_Gate is at a low level, the data writing transistor T4 may be turned on; only when the second scan control signal provided by the first scan control terminal N_Gate is at a high level, the compensation transistor T2 may be turned on; only when the second scan control signal provided by the initialization control terminal P_Gate(n−y) is at a high level, the first reset transistor T1 may be turned on. In practical applications, the first light emitting control terminal EM(n+x), the second light emitting control terminal EM(n), the first scan control terminal N_Gate, the second scan control terminal P_Gate and the initialization control terminal P_Gate(n−y) load the corresponding signals respectively, to control the turning-on and off of the corresponding transistors, and thus improve the control effect of the pixel circuit.

In an embodiment of the disclosure, active layers of the compensation transistor T2 and the first reset transistor T1 are made of a metal oxide semiconductor material; and active layers of the drive transistor T3, the data writing transistor T4, the first light emitting control transistor T5 and the second light emitting control transistor T6 are made of a low temperature poly-silicon material.

In a specific implementation process, as shown in FIG. 5 to FIG. 8, the active layers of the compensation transistor T2 and the first reset transistor T1 are made of the metal oxide semiconductor material; and the active layers of the drive transistor T3, the data writing transistor T4, the first light emitting control transistor T5 and the second light emitting control transistor T6 are made of the low temperature poly-silicon material. Correspondingly, the compensation transistor T2 and the first reset transistor T1 may be N-type transistors with the active layers made of the metal oxide semiconductor material, so that the compensation transistor T2 and the first reset transistor T1 have relatively small leakage currents. The drive transistor T3, the data writing transistor T4, the first light emitting control transistor T5 and the second light emitting control transistor T6 may be P-type transistors (that is, LTPS-type transistors) with the active layers made of the low temperature poly-silicon material, so that the drive transistor T3, the data writing transistor T4, the first light emitting control transistor T5 and the second light emitting control transistor T6 have the higher mobility, and may be made thinner and smaller, with lower power consumption, etc. In this case, the pixel circuit provided by an embodiment of the disclosure is essentially a Low Temperature Poly-silicon+Oxide (LTPO) pixel circuit manufactured by combination of processes of manufacturing two types of transistors (LTPS-type transistor and Oxide transistor), thus ensuring that the leakage current of the gate of the drive transistor T3 is relatively small, and the power consumption is relatively low.

It should be noted that the light emitting device 10 in embodiments of the disclosure may be set as an electroluminescent diode, e.g., at least one of Organic Light Emitting Diode (OLED), Quantum Dot Light Emitting Diode (QLED), or micro Light Emitting Diode/Mini Light Emitting Diode, which is not limited here. Here, the light emitting device 10 may include an anode, a light emitting layer and a cathode that are stacked. Further, the light emitting layer may also include a hole injection layer, a hole transport layer, an electron transport layer, an electron injection layer, and other layers. Of course, the light emitting device 10 may be designed according to requirements of the actual application environment in practical applications, and is not limited here.

Functions of the first and second electrodes of each of the above transistors are interchangeable according to corresponding types and different signals of signal terminals. For example, the first electrode may be a source, and correspondingly the second electrode may be a drain; for another example, the first electrode may be a drain, and correspondingly the second electrode may be a source, which is not limited here. Each transistor may be a Thin Film Transistor (TFT) or a Metal Oxide Semiconductor (MOS) field effect transistor, which is not limited here. Of course, the specific type of each transistor may also be set according to actual application requirements, and is not limited here.

The above is just an example to illustrate the specific structure of the pixel circuit provided by embodiments of the disclosure. In a specific implementation, the specific structure of the above-mentioned pixel circuit is not limited to the above-mentioned structures provided by embodiments of the disclosure, and may also be other structures known to those skilled in the art, which are all within the protection scope of the invention and are not limited here.

Figure 9:
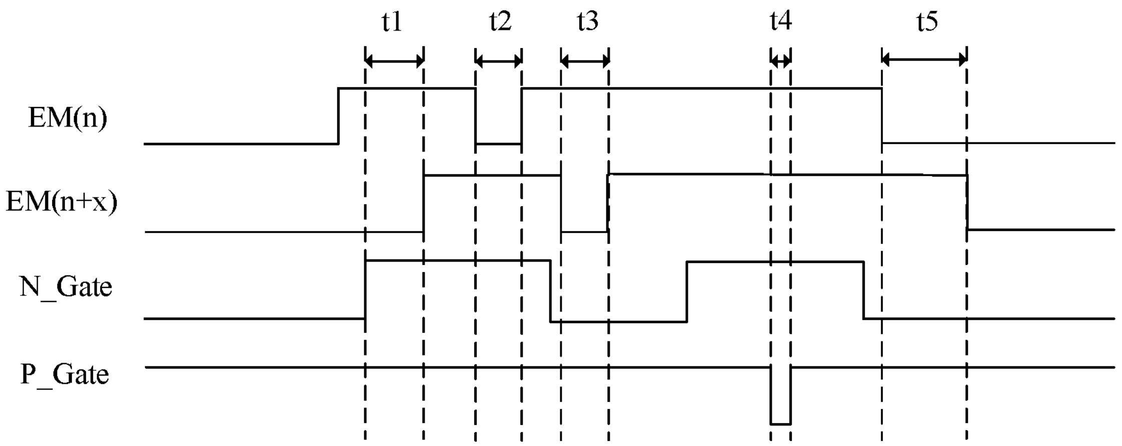
FIG. 9 is a timing diagram of a writing frame corresponding to the pixel circuit shown in FIG. 5.
Figure 10:
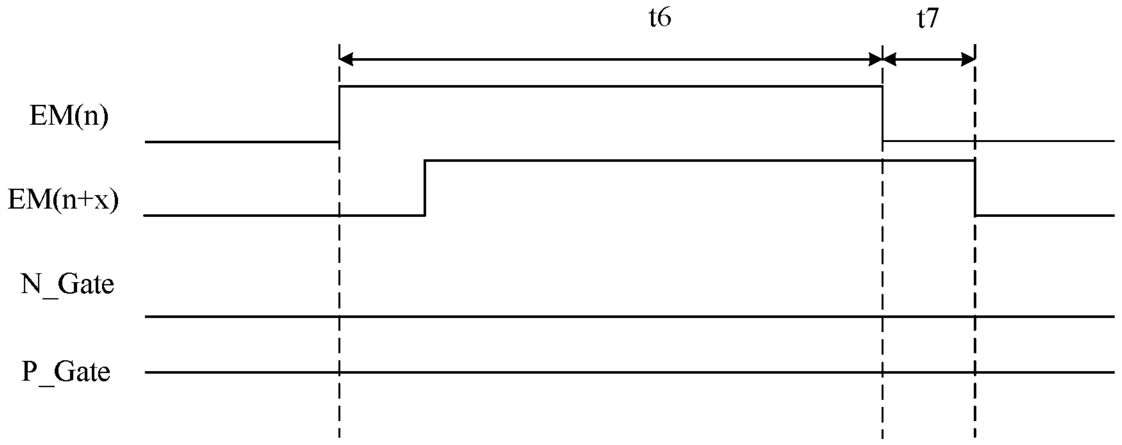
FIG. 10 is a timing diagram of a holding frame corresponding to the pixel circuit shown in FIG. 5.

The working process of the pixel circuit provided by embodiments of the disclosure will be illustrated below using the structure of the pixel circuit shown in FIG. 5 and the timing diagrams shown in FIG. 9 and FIG. 10, where FIG. 9 is a timing diagram of a writing frame corresponding to the pixel circuit shown in FIG. 5, and FIG. 10 is a timing diagram of a holding frame corresponding to the pixel circuit shown in FIG. 5. Here, a potential signal provided by the first power supply terminal VSS is at a low level, and a potential signal provided by the second power supply terminal VDD is at a high level. Moreover, a current display frame of the display device may be divided into one writing frame and N holding frames according to a current refresh frequency and a reference refresh frequency of the display device, where N is an integer greater than 1. For example, the current refresh frequency is 40 Hz, the reference refresh frequency is 120 Hz and is three times the current refresh frequency, and the current display frame may be divided into one writing frame and two holding frames in sequence. For another example, the current refresh frequency is 60 Hz, the reference refresh frequency is 120 Hz and is twice the current refresh frequency, and the current display frame may be divided into one writing frame and one holding frame in sequence. Of course, the current display frame may also be divided according to actual application requirements, which is not limited here. One writing frame includes a first phase t1, a second phase t2, a third phase t3, a fourth phase t4 and a fifth phase t5 arranged in sequence. It should be noted that embodiments of the disclosure are intended to better explain the pixel circuit provided by the disclosure and do not limit the specific implementations of the disclosure, where "0" represents the low level, and "1" represents the high level.

In the first phase t1, EM(n+x)=0, EM(n)=1, N_Gate=1, and P_Gate=1.

In the first phase t1, the first light emitting control transistor T5 is turned on under the control of the low level of the first light emitting control signal provided by the first light emitting control terminal EM(n+x), and the compensation transistor T2 is turned on under the control of the high level provided by the first scan control terminal N_Gate; and when the drive transistor T3 is turned on, N1, N2 and N3 are reset to the high level by the second power supply terminal VDD. The implementation process of the first phase t1 is roughly the same as the above phase ①. Moreover, the second light emitting control transistor T6 is turned off under the control of the high level of the second light emitting control signal provided by the second light emitting control terminal EM(n), and the light emitting device 10 does not emit light.

In the second phase t2, EM(n+x)=1, EM(n)=0, N_Gate=1, and P_Gate=1.

In the second phase t2, the first reset transistor T1 is turned on under the control of the high level of the first light emitting control signal provided by the first light emitting control terminal EM(n+x), the compensation transistor T2 is turned on under the control of the high level provided by the first scan control terminal N_Gate, and the second light emitting control transistor T6 is turned on under the control of the low level of the second light emitting control signal provided by the second light emitting control terminal EM(n). The first light emitting control transistor T5 is turned off under the control of the high level of the first light emitting control signal provided by the first light emitting control terminal EM(n+x). In the second phase t2, N4 is reset to the potential of the signal provided by the first initialization signal terminal Vinit1, the light emitting device 10 does not emit light, and N1, N2 and N3 are reset to the low level. The implementation process of the second phase t2 is roughly the same as the above phase 3̂.

In the third phase t3, EM(n+x)=0, EM(n)=1, N_Gate=0, and P_Gate=1.

In the third phase t3, the first light emitting control transistor T5 is turned on under the control of the low level of the first light emitting control signal provided by the first light emitting control terminal EM(n+x), the drive transistor T3 is turned on under the control of the low level of N1, N2 and N3 are reset to the high level, the compensation transistor T2 is turned off under the control of the low level provided by the first scan control terminal N_Gate, and N1 still remains at the low level. At this time, the drive transistor T3 has a larger Vgs, thereby alleviating the hysteresis problem of the drive transistor T3. Moreover, the second light emitting control transistor T6 is turned off under the control of the high level of the second light emitting control signal provided by the second light emitting control terminal EM(n), and the light emitting device 10 does not emit light. The implementation process of the third phase t3 is roughly the same as the above phase ②.

In the fourth phase t4, EM(n+x)=1, EM(n)=1, N_Gate=1, and P_Gate=0.

In the fourth phase t4, the first light emitting control transistor T5 is turned off under the control of the high level of the first light emitting control signal provided by the first light emitting control terminal EM(n+x), the second light emitting control transistor T6 is turned off under the control of the high level of the second light emitting control signal provided by the second light emitting control terminal EM(n), and the light emitting device 10 does not emit light. The first reset transistor T1 is turned on under the control of the high level of the first light emitting control signal provided by the first light emitting control terminal EM(n+x), and the first electrode (that is, N4) of the light emitting device 10 is reset to the potential of the signal provided by the initialization signal terminal Vinit1. The compensation transistor T2 is turned on under the control of the high level provided by the first scan control terminal N_Gate, the data writing transistor T4 is turned on under the control of the low level of the second scan control terminal P_Gate, and the drive transistor T3 is turned on under the control of the low level of N1. The data signal provided by the data signal terminal Data is loaded to the second electrode (that is, N2) of the drive transistor T3, and the threshold voltage of the drive transistor T3 and the data signal are written into the gate (that is, N1) of the drive transistor T3 through the compensation transistor T2 and stored in the first capacitor C1, thereby achieving the compensation for the threshold voltage of the drive transistor T3 and improving the uniformity. The implementation process of the fourth phase t4 is roughly the same as the above phase ④.

In the fifth phase t5, EM(n+x)=1, EM(n)=0, N_Gate=0, and P_Gate=1.

In the fifth phase t5, the first reset transistor T1 is turned on under the control of the high level of the first light emitting control signal provided by the first light emitting control terminal EM(n+x), the second light emitting control transistor T6 is turned on under the control of the low level provided by the second light emitting control terminal EM(n), the first light emitting control transistor T5 is turned off under the control of the high level of the first light emitting control signal provided by the first light emitting control terminal EM(n+x), and the first electrode (that is, N3) of the drive transistor T3 is reset to the potential of the signal provided by the first initialization signal terminal Vinit1. Correspondingly, N3 is reset to a low level, and the light emitting device 10 does not emit light. The implementation process of the fifth phase t5 is roughly the same as the above phase ⑤. Moreover, the entire reset process does not relate to the drive transistor T3, so N3 can be reset to a low level no matter what kind of picture is written, thereby ensuring the use performance of the pixel circuit.

In addition, the holding frame includes a sixth phase and a seventh phase arranged in sequence.

In the sixth phase t6, EM(n) and EM(n+x) are set high successively, N_Gate=0, and P_Gate=1.

In the sixth phase t6, EM(n) and EM(n+x) are set high successively, and correspondingly, the second light emitting control transistor T6 is turned off under the control of the second light emitting control signal provided by the second light emitting control terminal EM(n), and then the first light emitting control transistor T5 is turned off under the control of the first light emitting control signal provided by the first light emitting control terminal EM(n+x). Moreover, the first reset transistor T1 is turned on under the control of the high level of the first light emitting control signal provided by the first light emitting control terminal EM(n+x), and correspondingly, the first electrode (that is, N4) of the light emitting device 10 is reset to the potential of the signal provided by the first initialization signal terminal Vinit1 to complete the anode reset, and the light emitting device 10 does not emit light. At this time, the duty ratio of the light emitting phase can be controlled by controlling the duration in which the light emitting control signal is set high, to realize the flexible adjustment of the luminance of the holding frame. Also, the implementation process of the sixth phase t6 is roughly the same as the above phase ⑥.

In the seventh phase t7, EM(n+x)=1, EM(n)=0, N_Gate=0, and P_Gate=1.

In the seventh phase, the second light emitting control transistor T6 is turned on under the control of the low level of the second light emitting control signal provided by the second light emitting control terminal EM(n), the first light emitting control transistor T5 is turned off under the control of the high level of the first light emitting control signal provided by the first light emitting control terminal EM(n), and the light emitting device 10 does not emit light. The first reset transistor T1 is turned on under the control of the high level of the first light emitting control signal provided by the first light emitting control terminal EM(n+x), the first electrode (that is, N4) of the light emitting device 10 is reset to the potential of the signal provided by the initialization signal terminal Vinit1, and the first electrode (that is, N3) of the drive transistor T3 is reset to a low level. Also, the implementation process of the seventh phase t7 is roughly the same as the above phase ⑦.

It should be noted that, in the sixth phase t6 and the seventh phase t7, except that the light emitting control signal needs to be output, the control signals provided by the first scan control terminal N_Gate and the second scan control terminal P_Gate are kept in the stable state, the control signal provided by the first scan control terminal N_Gate is a constant low-potential signal, and the first scan control signal provided by the second scan control terminal P_Gate is a constant high-potential signal. In one of embodiments, for the pixel circuit shown in FIG. 5, if the display driver chip coupled to the pixel circuit cannot achieve different output implementations for the writing frame and the holding frame, only the signal outputs of the light emitting control terminals can be kept same as the writing frame, and the first scan control terminal N_Gate and the second scan control terminal P_Gate still remain at the low level and high level respectively, so that the functions of the sixth stage t6 and the seventh stage t7 can still be met, which will not be described in detail here.

Figure 11:
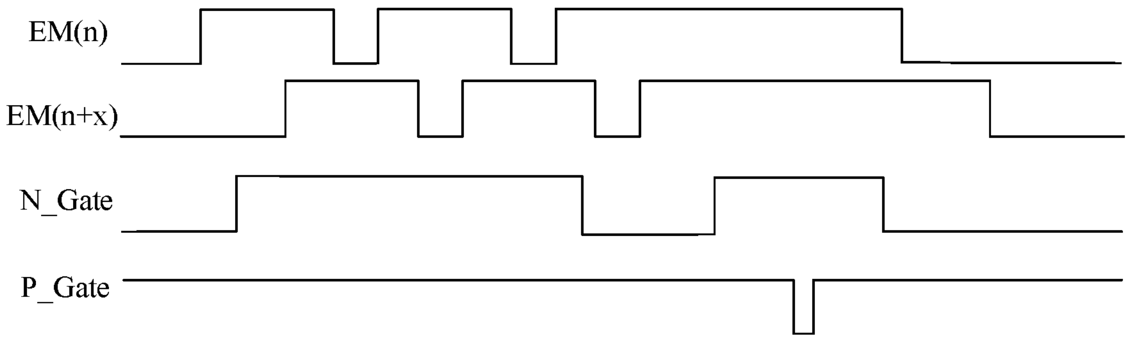
FIG. 11 is a timing diagram of a writing frame corresponding to the pixel circuit shown in FIG. 5.

In one of embodiments, each electrode of the drive transistor T3 may be repeatedly refreshed. Taking the timing diagram shown in FIG. 11 as an example, N1, N2 and N3 may be repeatedly refreshed at the high level and refreshed at the low level. FIG. 11 illustrates the case where the writing frame includes two repeating units arranged in sequence, by taking the first phase t1 and the second phase t2 as one repeating unit. Of course, it is also possible to continue to arrange a plurality of repeating units according to actual application requirements, and it is also possible to repeat other phases, which will not be described in detail here. In this way, the afterimage problem is alleviated.

Figure 12:
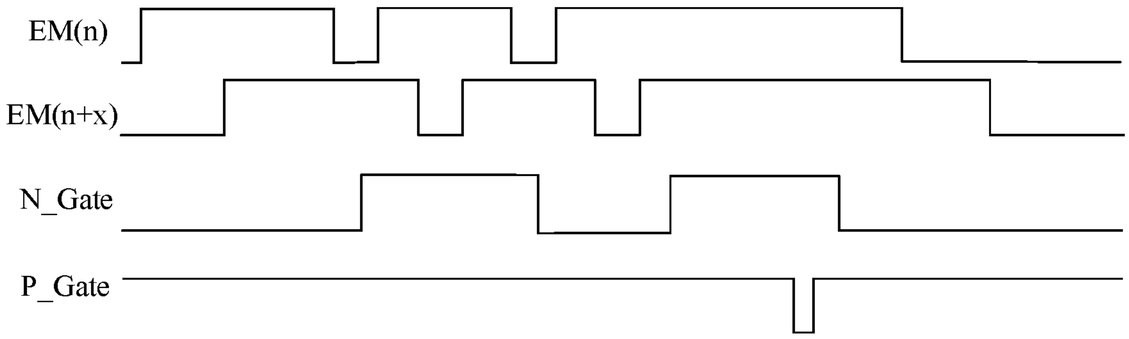
FIG. 12 is a timing diagram of a writing frame corresponding to the pixel circuit shown in FIG. 5.

In an embodiment of the disclosure, the duty ratio of the light emitting phase may be changed by adjusting the width of the high level of the light emitting control signal, to realize the adjustment of the brightness of the pixel circuit. In one of embodiments, the adjustment may be made by moving forward the rising edge of the light emitting control signal. Taking the timing diagram shown in FIG. 12 as an example, the writing frame includes two repeating units including a first repeating unit and a second repeating unit arranged in sequence, where a duration occupied by the second light emitting control signal in the first repeating unit is greater than a duration occupied by the second light emitting control signal in the second repeating unit; a duration occupied by the first light emitting control signal in the first repeating unit is greater than a duration occupied by the first light emitting control signal in the second repeating unit, thus realizing the adjustment of the duty ratio of the light emitting phase.

Figure 13:
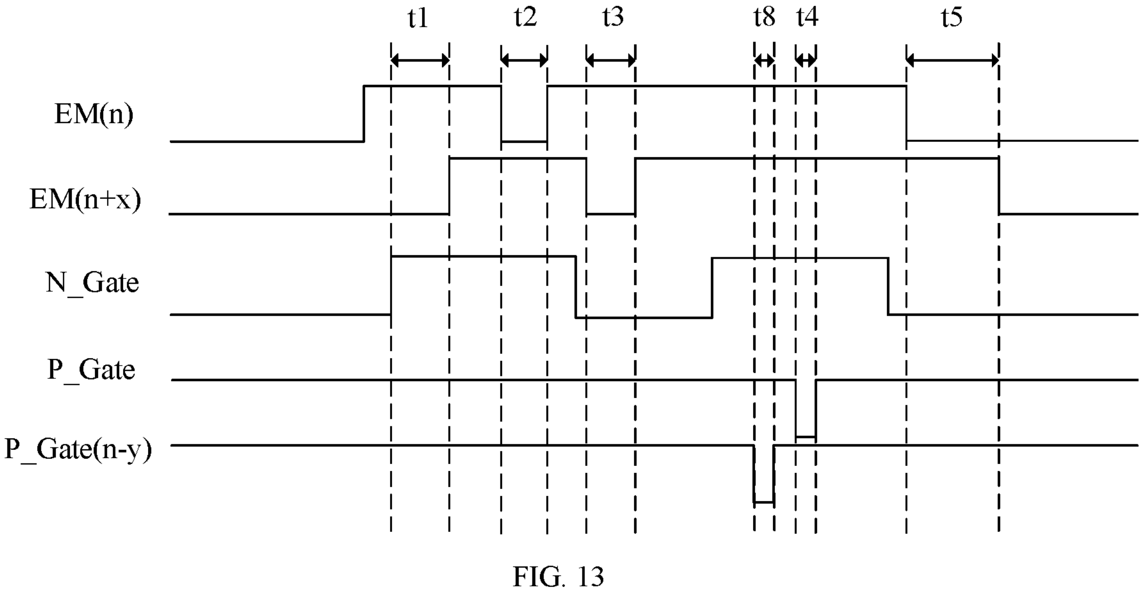
FIG. 13 is a timing diagram of a writing frame corresponding to the pixel circuit shown in FIG. 6.

In one of embodiments, the pixel circuit shown in FIG. 6 may also adopt the timing diagram shown in FIG. 13, where the writing frame further includes an eighth phase t8 between the third phase t3 and the fourth phase t4. In a time period between the eighth phase t8 and the fourth phase t4, the signals loaded by the first light emitting control terminal EM(n+x), the second light emitting control terminal EM(n), the first scan control terminal N_Gate and the second scan control terminal P_Gate are kept to be in a stable voltage state; and a potential of the gate of the drive transistor T3 is kept to be same as a control signal provided by a second initialization signal terminal coupled to the second reset transistor T7. In this case, there is no signal jump in the time period between the eighth phase t8 and the fourth phase t4, and the potential of the node N1 remains at Vinit1. Moreover, the voltage for resetting the node N1 is separated from the voltage for resetting the anode, improving the control capability of the pixel circuit.

In an embodiment of the disclosure, the first light emitting control transistor T5, the second light emitting control transistor T6, the drive transistor T3 and the data writing transistor T4 are all P-type transistors; and the compensation transistor T2 and the first reset transistor T1 are both N-type transistors.

In an embodiment of the disclosure, active layers of the compensation transistor T2 and the first reset transistor T1 are made of a metal oxide semiconductor material; and active layers of the drive transistor T3, the data writing transistor T4, the first light emitting control transistor T5 and the second light emitting control transistor T6 are made of a low temperature poly-silicon material. Here, the transistor with the active layer made of the metal oxide semiconductor material has a lower leakage current, and the transistor with the active layer made of the low temperature poly-silicon material has a high mobility, which can accelerate the charging speed. In this way, the pixel circuit provided by an embodiment of the disclosure can combine the advantages of the two types of transistors, and is helpful for the development of display products with high resolution, low power consumption and high image quality.

Based on the same disclosure concept, an embodiment of the disclosure further provides a display device, which includes any one of the pixel circuits described above.

Since the principle of the display device to solve the problem is similar to that of the above-mentioned pixel circuit, implementations of the display device can refer to implementations of the above-mentioned pixel circuit, and the repeated description thereof will be omitted here.

In a specific implementation process, the display device provided by an embodiment of the disclosure may be a mobile phone, a tablet, a television, a display, a laptop, a digital photo frame, a navigator, or any other product or component with display functions. All of other indispensable components of the display device should be understood by those ordinary skilled in the art to be included, and will be omitted here and should not be considered as limitations on the disclosure.

Figure 14:
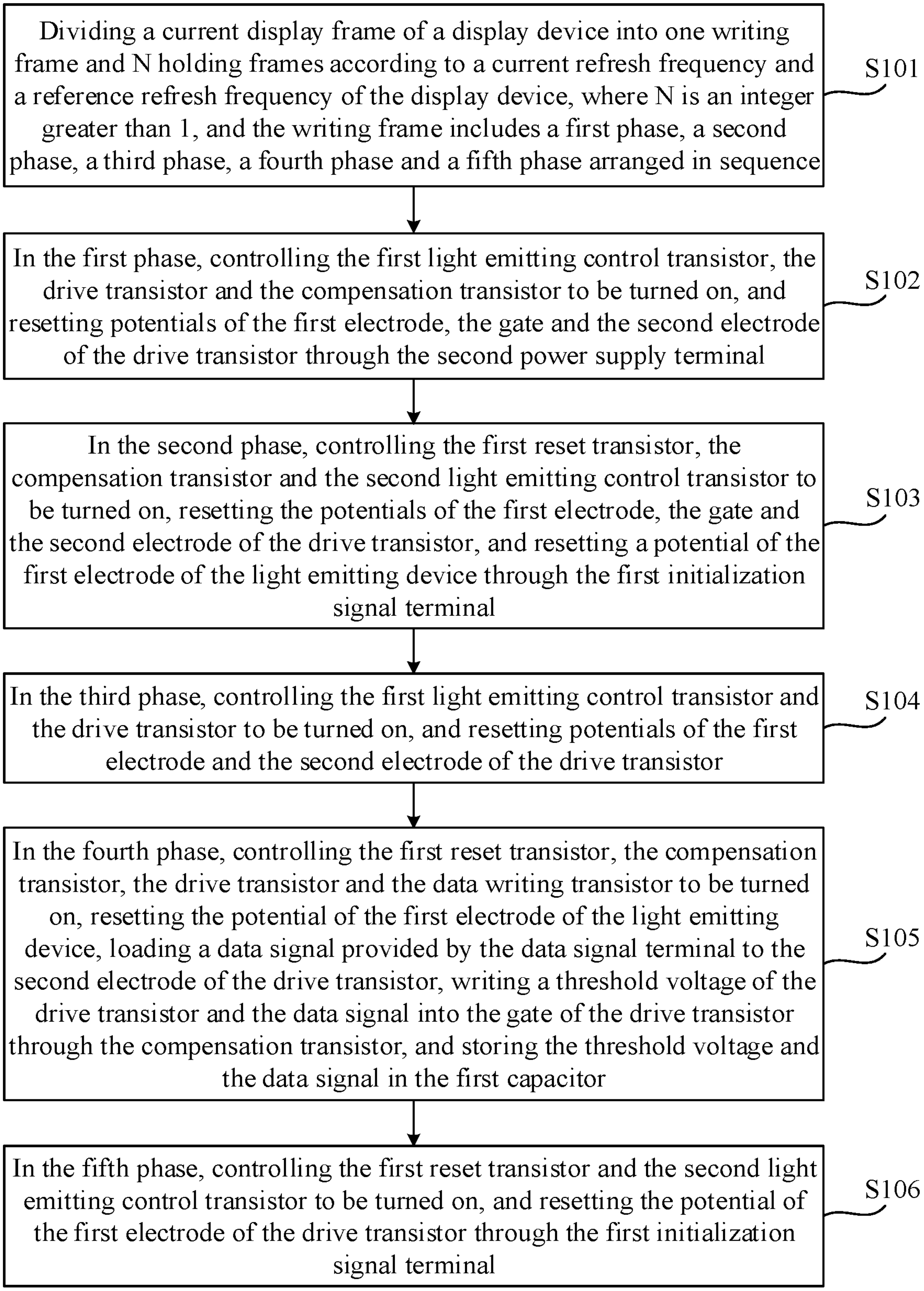
FIG. 14 is a method flowchart of a driving method for a pixel circuit according to an embodiment of the disclosure.

Based on the same disclosure concept, as shown in FIG. 14, an embodiment of the disclosure further provides a driving method for the above-mentioned pixel circuit, including following steps.

S101: dividing a current display frame of a display device into one writing frame and N holding frames according to a current refresh frequency and a reference refresh frequency of the display device, where N is an integer greater than 1, and the writing frame includes a first phase, a second phase, a third phase, a fourth phase and a fifth phase arranged in sequence.

S102: in the first phase, controlling the first light emitting control transistor, the drive transistor and the compensation transistor to be turned on, and resetting potentials of the first electrode, the gate and the second electrode of the drive transistor through the second power supply terminal.

S103: in the second phase, controlling the first reset transistor, the compensation transistor and the second light emitting control transistor to be turned on, resetting the potentials of the first electrode, the gate and the second electrode of the drive transistor, and resetting a potential of the first electrode of the light emitting device through the first initialization signal terminal.

S104: in the third phase, controlling the first light emitting control transistor and the drive transistor to be turned on, and resetting potentials of the first electrode and the second electrode of the drive transistor.

S105: in the fourth phase, controlling the first reset transistor, the compensation transistor, the drive transistor and the data writing transistor to be turned on, resetting the potential of the first electrode of the light emitting device, loading a data signal provided by the data signal terminal to the second electrode of the drive transistor, writing a threshold voltage of the drive transistor and the data signal into the gate of the drive transistor through the compensation transistor, and storing the threshold voltage and the data signal in the first capacitor.

S106: in the fifth phase, controlling the first reset transistor and the second light emitting control transistor to be turned on, and resetting the potential of the first electrode of the drive transistor through the first initialization signal terminal.

In one of embodiments, for the specific implementation process of the steps S101 to S106, reference may be made to the foregoing description of the corresponding part using the pixel circuit shown in FIG. 5 and the timing diagram shown in FIG. 9, which will not be repeated here.

Figure 15:
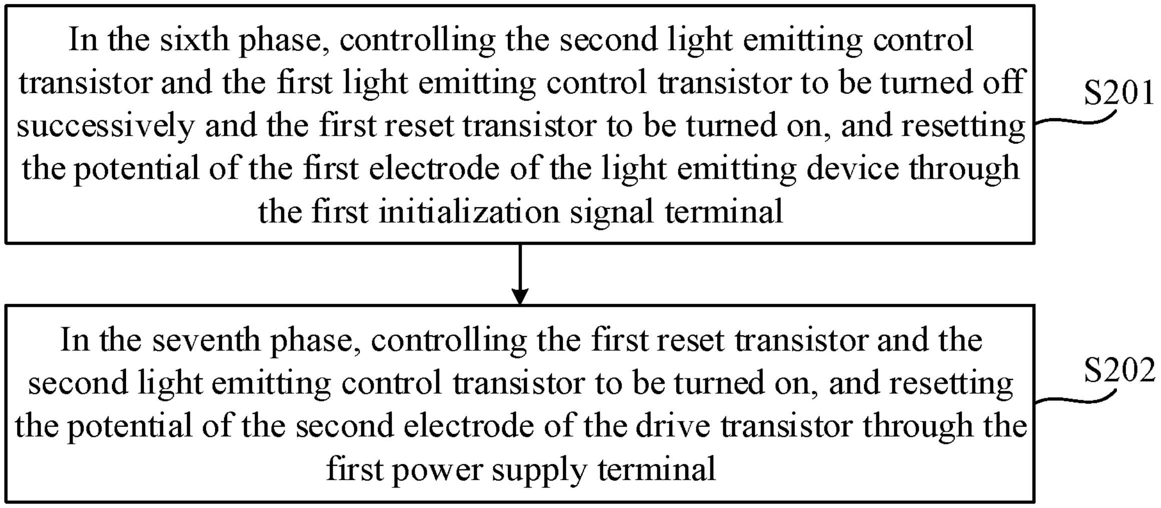
FIG. 15 is a method flowchart of a driving method for a pixel circuit according to an embodiment of the disclosure.

In an embodiment of the disclosure, as shown in FIG. 15, the holding frame includes a sixth phase and a seventh phase arranged in sequence, and the method further includes following steps.

S201: in the sixth phase, controlling the second light emitting control transistor and the first light emitting control transistor to be turned off successively and the first reset transistor to be turned on, and resetting the potential of the first electrode of the light emitting device through the first initialization signal terminal.

S202: in the seventh phase, controlling the first reset transistor and the second light emitting control transistor to be turned on, and resetting the potential of the second electrode of the drive transistor through the first power supply terminal.

In one of embodiments, for the specific implementation process of the steps S201 to S202, reference may be made to the foregoing description of the corresponding part using the pixel circuit shown in FIG. 5 and the timing diagram shown in FIG. 10, which will not be repeated here.

In an embodiment of the disclosure, the first phase and the second phase are taken as a repeating unit, the writing frame includes M repeating units arranged in sequence, and M is a positive integer greater than 1.

In an embodiment of the disclosure, the M repeating units include two repeating units including a first repeating unit and a second repeating unit, and a duration occupied by the second light emitting control signal in the first repeating unit is greater than a duration occupied by the second light emitting control signal in the second repeating unit. For the specific implementation process of this part, reference may be made to the foregoing description of the corresponding part using the pixel circuit shown in FIG. 5 and the timing diagram shown in FIG. 12, which will not be repeated here.

In an embodiment of the disclosure, the pixel circuit further includes a second reset transistor, the writing frame further includes an eighth phase between the third phase and the fourth phase, and the method further includes: in a time period between the eighth phase and the fourth phase, keeping signals loaded by the first light emitting control terminal, the second light emitting control terminal, the first scan control terminal and the second scan control terminal to be in a stable voltage state; and keeping a potential of the gate of the drive transistor to be same as a control signal provided by a second initialization signal terminal coupled to the second reset transistor. For the specific implementation process of this part, reference may be made to the foregoing description of the corresponding part using the pixel circuit shown in FIG. 6 and the timing diagram shown in FIG. 13, which will not be repeated here.

Figure 16:
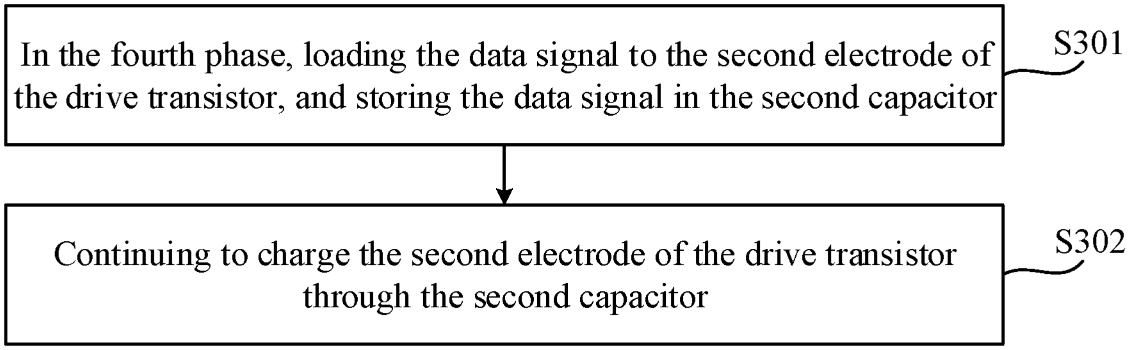
FIG. 16 is a method flowchart of a driving method for a pixel circuit according to an embodiment of the disclosure.

In an embodiment of the disclosure, as shown in FIG. 16, the pixel circuit further includes a second capacitor coupled between the second power supply terminal and the second electrode of the drive transistor, and the method further includes following steps.

S301: in the fourth phase, loading the data signal to the second electrode of the drive transistor, and storing the data signal in the second capacitor.

S302: continuing to charge the second electrode of the drive transistor through the second capacitor.

For the specific implementation process of the step S301 to step S302, reference may be made to the foregoing description of relevant parts in the pixel circuit, which will not be repeated here.

Although embodiments of the disclosure have been described, those skilled in the art can make additional alterations and modifications to these embodiments once they learn about the basic creative concepts. Thus, the attached claims are intended to be interpreted to include embodiments as well as all the alterations and modifications falling within the scope of the disclosure.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A driving method for a pixel circuit, the pixel circuit comprising: a first reset transistor, a compensation transistor, a drive transistor, a data writing transistor, a first light emitting control transistor, a second light emitting control transistor, a light emitting device and a first capacitor; wherein:

the first reset transistor is coupled between a first electrode of the light emitting device and a first initialization signal terminal, and a gate of the first reset transistor is coupled to a first light emitting control terminal;

a second electrode of the light emitting device is coupled to a first power supply terminal;

the compensation transistor is coupled between a gate and a first electrode of the drive transistor, and a gate of the compensation transistor is coupled to a first scan control terminal;

the data writing transistor is coupled between a second electrode of the drive transistor and a data signal terminal, and a gate of the data writing transistor is coupled to a second scan control terminal;

the first light emitting control transistor is coupled between a second power supply terminal and the second electrode of the drive transistor, and a gate of the first light emitting control transistor is coupled to the first light emitting control terminal;

the second light emitting control transistor is coupled between the first electrode of the drive transistor and the first electrode of the light emitting device, and a gate of the second light emitting control transistor is coupled to a second light emitting control terminal;

the first capacitor is coupled between the second power supply terminal and the gate of the drive transistor;

wherein types of the first light emitting control transistor and the second light emitting control transistor are same and opposite to a type of the first reset transistor; the first light emitting control terminal is configured to receive a first light emitting control signal, the second light emitting control terminal is configured to receive a second light emitting control signal, the first light emitting control signal and the second light emitting control signal are provided by output terminals in different stages of a same light emitting drive unit, and the second light emitting control signal is earlier than the first light emitting control signal;

the method comprises:

dividing a current display frame of a display device into one writing frame and N holding frames according to a current refresh frequency and a reference refresh frequency of the display device, wherein N is an integer greater than 1, and the writing frame comprises a first phase, a second phase, a third phase, a fourth phase and a fifth phase arranged in sequence;

in the first phase, controlling the first light emitting control transistor, the drive transistor and the compensation transistor to be turned on, and resetting potentials of the first electrode, the gate and the second electrode of the drive transistor through the second power supply terminal;

in the second phase, controlling the first reset transistor, the compensation transistor and the second light emitting control transistor to be turned on, resetting the potentials of the first electrode, the gate and the second electrode of the drive transistor, and resetting a potential of the first electrode of the light emitting device through the first initialization signal terminal;

in the third phase, controlling the first light emitting control transistor and the drive transistor to be turned on, and resetting potentials of the first electrode and the second electrode of the drive transistor;

in the fourth phase, controlling the first reset transistor, the compensation transistor, the drive transistor and the data writing transistor to be turned on, resetting the potential of the first electrode of the light emitting device, loading a data signal provided by the data signal terminal to the second electrode of the drive transistor, writing a threshold voltage of the drive transistor and the data signal into the gate of the drive transistor through the compensation transistor, and storing the threshold voltage and the data signal in the first capacitor;

in the fifth phase, controlling the first reset transistor and the second light emitting control transistor to be turned on, and resetting a potential of the first electrode of the drive transistor through the first initialization signal terminal.

2. The method according to claim 1, wherein the holding frame comprises a sixth phase and a seventh phase arranged in sequence, and the method further comprises:

in the sixth phase, controlling the second light emitting control transistor and the first light emitting control transistor to be turned off successively and the first reset transistor to be turned on, and resetting the potential of the first electrode of the light emitting device through the first initialization signal terminal;

in the seventh phase, controlling the first reset transistor and the second light emitting control transistor to be turned on, and resetting a potential of the second electrode of the light emitting device through the first power supply terminal.

3. The method according to claim 1, wherein the first phase and the second phase are taken as a repeating unit, the writing frame comprises M repeating units arranged in sequence, and M is a positive integer greater than 1.

4. The method according to claim 3, wherein the M repeating units comprise two repeating units comprising a first repeating unit and a second repeating unit, and a duration occupied by the second light emitting control signal in the first repeating unit is greater than a duration occupied by the second light emitting control signal in the second repeating unit.

5. The method according to claim 1, wherein the pixel circuit further comprises a second reset transistor, the writing frame further comprises an eighth phase between the third phase and the fourth phase, and the method further comprises:

in a time period between the eighth phase and the fourth phase, keeping signals loaded by the first light emitting control terminal, the second light emitting control terminal, the first scan control terminal and the second scan control terminal to be in a stable voltage state; and keeping a potential of the gate of the drive transistor to be same as a control signal provided by a second initialization signal terminal coupled to the second reset transistor.

6. The method according to claim 5, wherein the pixel circuit further comprises a second capacitor coupled between the second power supply terminal and the second electrode of the drive transistor, and the method further comprises:

in the fourth phase, loading the data signal to the second electrode of the drive transistor, and storing the data signal in the second capacitor;

continuing to charge the second electrode of the drive transistor through the second capacitor.

* * * * *